US009399558B2

(12) United States Patent
Guernsey et al.

(10) Patent No.: US 9,399,558 B2
(45) Date of Patent: *Jul. 26, 2016

(54) CLEANABLE DIVERTER WITH VERTICAL PLATE

(71) Applicant: Laitram, L.L.C., Harahan, LA (US)

(72) Inventors: Kevin W. Guernsey, Destin, FL (US); Brian R. Lee, Kenner, LA (US); Jorge E. Nagel, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/656,896

(22) Filed: Mar. 13, 2015

(65) Prior Publication Data

US 2015/0183592 A1    Jul. 2, 2015

Related U.S. Application Data

(63) Continuation of application No. 13/839,326, filed on Mar. 15, 2013, now Pat. No. 8,985,304.

(60) Provisional application No. 61/668,182, filed on Jul. 5, 2012.

(51) Int. Cl.
*B65G 47/10* (2006.01)
*B65G 47/84* (2006.01)
*B65G 47/52* (2006.01)

(52) U.S. Cl.
CPC .............. *B65G 47/844* (2013.01); *B65G 47/52* (2013.01)

(58) Field of Classification Search
CPC ............................. B65G 47/844; B65G 47/52
See application file for complete search history.

(56) References Cited

U.S. PATENT DOCUMENTS

| 2,868,394 | A | 1/1959 | Nelson et al. |
|---|---|---|---|
| 4,283,245 | A | 8/1981 | Benoit |
| 4,732,260 | A | 3/1988 | Canziani |
| 5,038,912 | A | 8/1991 | Cotter |
| 5,127,510 | A | 7/1992 | Cotter et al. |
| 5,167,315 | A | 12/1992 | Doane |
| 5,333,715 | A | 8/1994 | Sapp |
| 5,909,797 | A | 6/1999 | Van Den Goor |
| 5,921,378 | A | 7/1999 | Bonnet |
| 5,950,798 | A | 9/1999 | Bonnet |
| 5,967,289 | A | 10/1999 | Kelsey |
| 5,971,132 | A | 10/1999 | Bonnet |
| 6,041,909 | A | 3/2000 | Shearer, Jr. |
| 6,044,956 | A | 4/2000 | Henson et al. |

(Continued)

FOREIGN PATENT DOCUMENTS

| JP | 2000-344323 A | 12/2000 |
|---|---|---|
| WO | 2014011478 A1 | 1/2014 |

OTHER PUBLICATIONS

International Search Report and Written Opinion of the International Searching Authority, PCT/US2013/048652, KIPO, mailed Oct. 4, 2013, Republic of Korea.

(Continued)

*Primary Examiner* — William R Harp
(74) *Attorney, Agent, or Firm* — James T. Cronvich

(57) ABSTRACT

A cleanable shoe-type diverter belt having pegs that travel across the width of the diverter belt. Guides extending diagonally across the width of the belt contact the pegs to translate the pegs along their slots. In some versions vertical plates are attached to the pegs.

6 Claims, 14 Drawing Sheets

(56) References Cited

U.S. PATENT DOCUMENTS

| | | |
|---|---|---|
| 6,702,106 B1 | 3/2004 | Sweazy |
| 6,705,452 B2 | 3/2004 | Greve et al. |
| 6,802,412 B2 | 10/2004 | Lapeyre et al. |
| 6,923,308 B2 | 8/2005 | Veit |
| 6,974,019 B2 | 12/2005 | Lapeyre et al. |
| 7,021,452 B2 | 4/2006 | Horton et al. |
| 7,628,265 B2 | 12/2009 | Verploegen et al. |
| 8,985,304 B2 * | 3/2015 | Guernsey ............ B65G 47/844 198/370.07 |
| 2004/0094387 A1 | 5/2004 | Lapeyre et al. |
| 2011/0108388 A1 | 5/2011 | Van Den Goor et al. |
| 2014/0008178 A1 | 1/2014 | Guernsey et al. |

OTHER PUBLICATIONS

International Search Report and Written Opinion of the International Searching Authority, PCT/US2015/037171, Korean Intellectual Property Office, mailed Sep. 18, 2015, Republic of Korea.

* cited by examiner

CLEANABLE DIVERTER WITH VERTICAL PLATE

CROSS-REFERENCE TO RELATED APPLICATIONS

This application is a continuation of U.S. patent application Ser. No. 13/839,326, entitled "Cleanable Diverter," filed Mar. 15, 2013, now U.S. Pat. No. 8,985,304, which claimed the benefit of U.S. Provisional Patent Application No. 61/668,182, entitled "Cleanable Diverter," filed Jul. 5, 2012. The disclosures of both those applications are incorporated into this application by reference.

BACKGROUND

The invention relates generally to power-driven conveyors and more particularly to shoe-type diverters.

Article diverters, such as shoe sorters, are used to translate articles across the width of a conveyor as the conveyor transports the articles in a conveying direction. Typical shoe sorters include article-pushing elements referred to as shoes that are driven laterally across the conveyor to push articles off one or both sides of the conveyor to one or more outfeed locations. Slat conveyors and modular conveyor belts are used as the platform for the shoes, which ride in tracks extending across the widths of the slats or belt modules. The shoes are conventionally blocked-shaped with depending structural elements that keep the shoe in the track or extend below to engage carryway guides that control the positions of the shoes. Although shoe sorters and other diverters are widely used in package-handling applications, they are not so useful in food-handling and other applications where sanitation is important because they are not easy to clean. Thus, there is a need for cleanable shoe-type diverters.

SUMMARY

One version of a conveyor belt embodying features of the invention comprises parallel tracks extending transversely across the width of the conveyor belt on the belt's top side and pegs arranged to ride along the tracks. Each of the pegs includes an upper portion above the top side of the conveyor belt. Vertical plates extend above the top side of the conveyor belt from the upper portion of the pegs. The vertical plates ride with the pegs along the tracks.

In another aspect of the invention, a conveyor comprises a conveyor belt as described in the previous paragraph and a guide having a guide surface angled across the width of the conveyor belt in contact with the pegs to push the pegs along the track as the conveyor belt advances in the direction of belt travel.

BRIEF DESCRIPTION OF THE DRAWINGS

These features of the invention, as well as other aspects and advantages, are described in more detail in the following description, appended claims, and accompanying drawings, in which:

DETAILED DESCRIPTION

Figure 1:
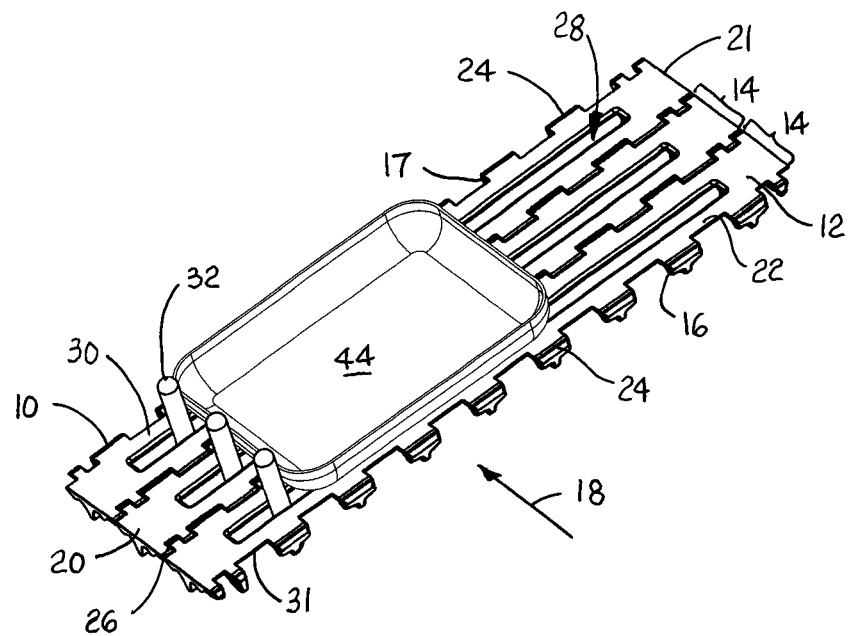
FIG. 1 is an isometric view of a portion of a diverter belt embodying features of the invention.
Figure 2:
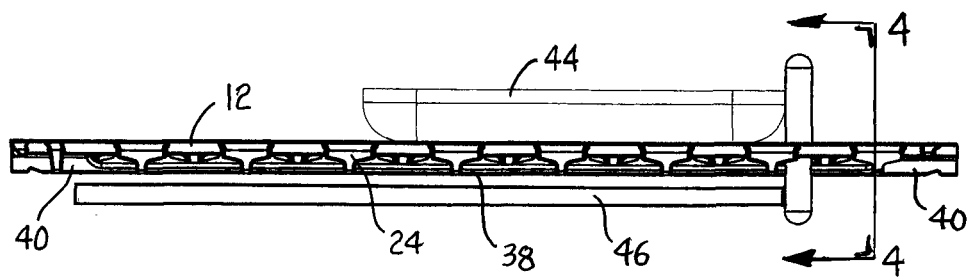
FIG. 2 is a front elevation view of the belt portion of FIG. 1.

FIGS. 1 and 2 show a portion of the conveyor belt usable as an article diverter embodying features of the invention. The conveyor belt 10 is constructed of a series of conveyor belt modules 12 arranged in rows 14. Each conveyor module 12 extends in length from a trailing end 16 to a leading end 17 in a conveying direction 18, i.e., a direction of belt travel. The modules 12 extend in width from a left side 20 to a right side 21. The module has an intermediate portion, in the form of a central deck 22, and hinge elements 24 spaced apart along the trailing and leading ends 16, 17 of the module 12. The hinge elements 24 are interconnected, by hinge pins, for example, at hinge joints 26 between adjacent rows 14. Instead of a modular hinged belt, a slat conveyor belt constructed of slat modules between flanking roller chains could be used.

Figure 4:
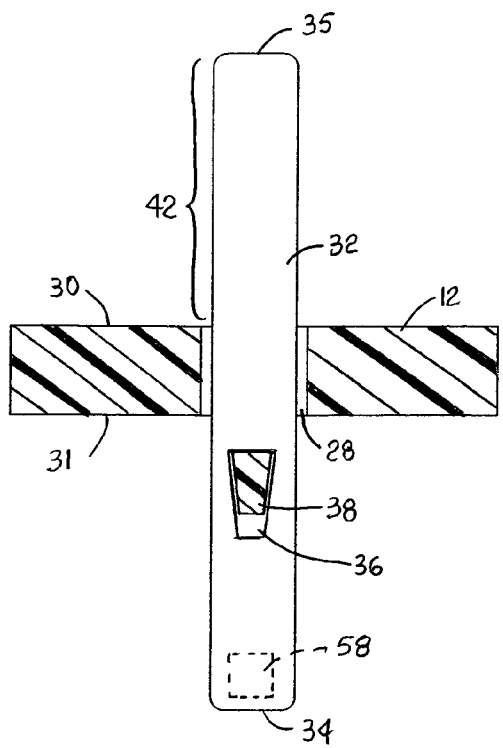
FIG. 4 is an enlarged cross section of the conveyor belt of FIG. 2 viewed along line 4-4.

An elongated slot 28 extends through the deck 22 from a top conveying side 30 to an opposite bottom side 31 and across the majority of the width of the module midway between its two ends 16, 17. A pusher 32, in the form of a peg, is received in the slot 28, as also shown in FIG. 4. The pusher extends from a bottom end 34 to an opposite top end 35. A through hole 36 is disposed in the pusher between its two opposite ends 34, 35. The pusher in this example is realized as a monolithic element homogeneously formed as a single piece by molding, for example. A transverse bar 38 extending across the width of the module below the deck 22 is connected to the underside of the module near the left and right sides 20, 21 by webs 40, as shown in FIG. 2. The bar is received in the pusher's through hole 36. The bar 38, which is parallel to the slot 28, retains the pusher 32 and allows it to translate along the slot. The bar may also serve as a drive bar engaged by drive and idle sprockets in a positively driven conveyor system. The upper portion 42 of the pusher 32 between the pusher's top end 35 and the top side 30 of the deck 22 is used like a shoe to push articles 44 transversely across the module 12 toward either side.

Figure 3:
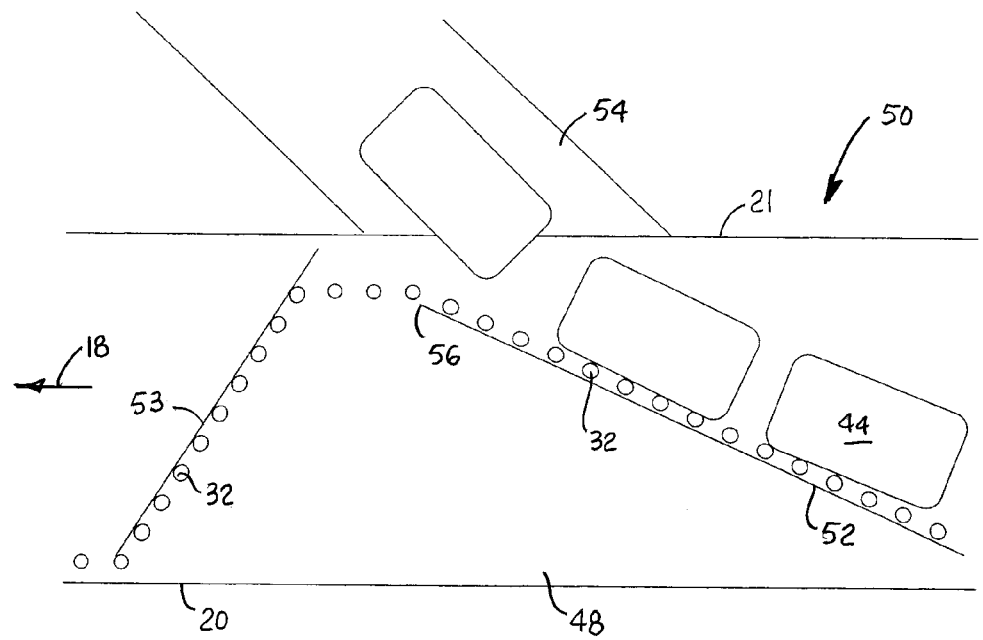
FIG. 3 is a plan schematic of a sorter using a belt as in FIG. 1.

A guide mechanism 46 underlies the belt 10 along an upper carryway 48, as shown in FIGS. 2 and 3, and, along with the belt, forms a diverting conveyor 50, such as a sorter. The guide mechanism 46 shown schematically in FIG. 3 is a conventional system of mechanical guides 52, 53 in the carryway 48 having vertical surfaces that engage the bottom ends 34 of the pushers 32 to divert the pushers across the belt. The bottom ends, acting like keels or cam followers, follow the guides as the belt 12 advances in the conveying direction 18. As shown in FIG. 3, the peg pushers 32 in each module translate as guided by the upstream guide 52. In this example, the article 44, such as a tray, is pushed toward and off the right side 21 of the belt by the pushers to an outfeed conveyor 54 disposed at a specific location along the conveyor. After passing the downstream end 56 of the upstream guide 53, the pushers remain in their transverse position until they reach the downstream return guide 53, which guides the pushers back to the left side 20 of the belt. Of course, many different diverters with multiple outfeed conveyors on both sides and associated guide arrangements can be used besides the one in FIG. 3, which is used as a simple example to describe the operation of a sorter. Furthermore, different guide mechanisms may be used. For example, the pusher can include a magnetic material such as magnetic or ferrous particles or a magnetic or magnetically attractive element (58, FIG. 4), such as a magnet or a piece of iron. The guide mechanism would then include magnetic guides or an electromagnetic array to translate the pushers across the belt.

Figure 5A:
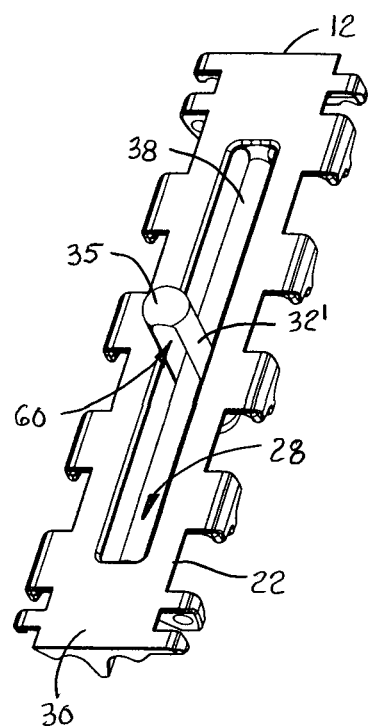
FIGS. 5A and 5B are axonometric views of a module usable in a diverter belt as in FIG. 1 with a slotted, retractable pusher in extended and retracted positions.
Figure 5B:
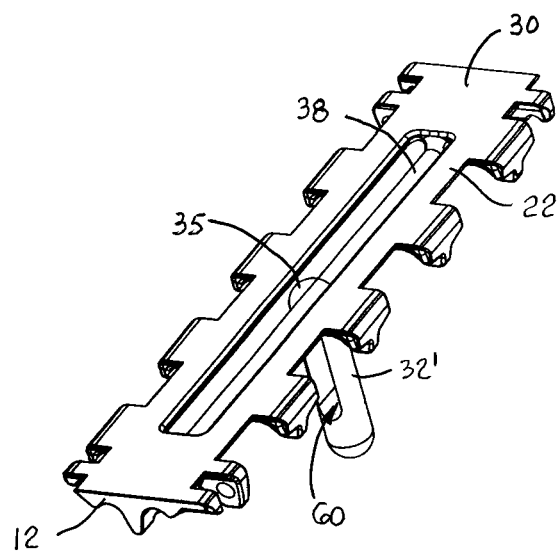

Another version of the pusher is shown in the module 12 of FIGS. 5A and 5B. The pusher 32' has a vertically elongated, slot-like through hole 60 receiving the transverse bar 38. The elongated through hole extends close to the top end 35 of the pusher 32' and allows it to be retracted to a level below the top side 30 of the deck 22. A horizontal cam surface 61 in the carryway is positioned high enough to force the bottom side 34 of the pusher 32' upward toward the slot 28 to maintain the pusher in an extended position above the deck. When the horizontal cam surface is lowered or absent, the pusher 32' falls into its retracted position below the top side of the deck.

Figure 6:
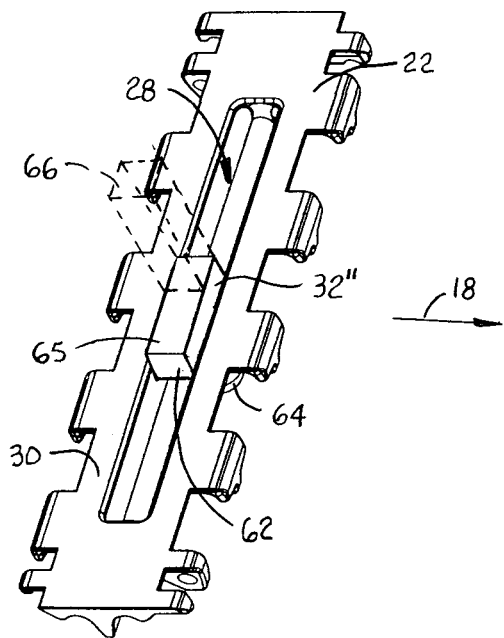
FIG. 6 is an axonometric view of a module usable in a diverter belt as in FIG. 1 with a pusher having a parallelepiped-shaped article-contacting portion above the deck.

Yet another version of the pusher is shown in FIG. 6. The pusher 32" has a parallelepiped-shaped article-contacting platform portion 62 that extends above the top side 30 of the deck 22 and a bottom cam-follower 64 like that for the pusher of FIG. 1. The maximum dimension of the article-contacting portion 62 in the conveying direction 18 is slightly less than the width of the slot 28 in the conveying direction so that the pusher 32" does not overlap the top side 30 of the deck 22. The height of the pusher 32" could be even less than indicated in FIG. 6 to form a platform 65 elevated slightly above the top side 30 to engage the bottoms of conveyed articles, lift them slightly, and carry them across the deck 22. The pusher 32" could include a vertical peg pushing portion 66 that forms an L shape with the horizontal article-contacting supporting platform portion 62.

Unlike conventional blocky shoes, the narrow pegs 32, 32' of FIGS. 1-5 and the narrow parallelepiped-shaped pushers 32" of FIG. 6 do not overlap and occlude any portion of the deck 22—top or bottom. That makes the top side 30 of the belt accessible and easy to clean.

Figure 7A:
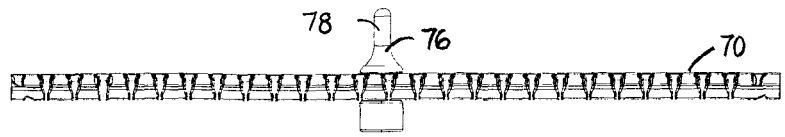
FIGS. 7A-7D are front views of another version of a belt module embodying features of the invention.
Figure 7B:
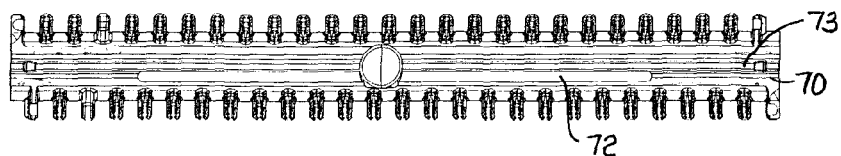
Figure 7C:
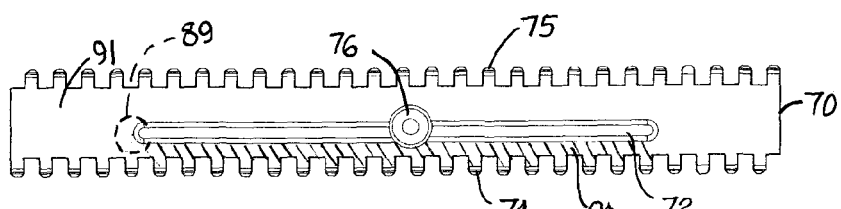
Figure 7D:
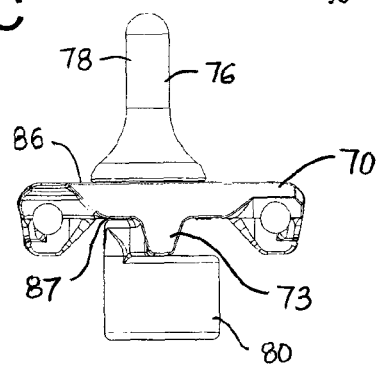

Another version of a conveyor belt module with a peg pusher is shown in FIGS. 7A-7D. The belt module 70 is similar to the module 12 of FIG. 5A, but differs in that it has an elongated slot 72 that is longitudinally offset from its central drive bar 73. In other words, the slot is closer to a first end 74 of the module than to its opposite second end 75. A peg pusher 76 is slidably retained in the slot 72. The pusher 76 has an upper portion 78 and a lower cam-follower portion 80 joined by an intermediate shank portion 82, as shown in FIGS. 8A and 8B. The pusher in this example is realized as a monolithic element homogeneously formed as a single piece by molding, for example. The upper portion is pawn-shaped and flares outward toward the bottom to form a skirt 84 that slides along the top conveying surface 86 of the belt module 70. The narrow shank 82 resides in the slot 72. The lower portion 80 has an upper shoulder 88 that slides along the bottom surface 87 of the module. The height of the shank 82 is slightly greater than the thickness of the module 70 at the slot. The height of the shoulder portion 88 is slightly greater than the height of the drive bar 73 so that the cam follower 80 is below the bottom of the drive bar. The outer dimensions of the pusher slightly above the top conveying side 86 and slightly below the bottom side 87 of the intermediate portion are slightly greater than the width of the slot—enough to retain the pusher in the slot. The narrow portion 90 of the deck 91 of the plastic module between the slot 72 and the first end 74 and shown hatched in FIG. 7C is flexed upward or downward to temporarily widen the slot to admit the pusher into place. Once the pusher is in place the narrow portion 90 is released, and the module 70 returns to its natural state retaining the pusher 76. Alternatively, the slot 72 could have a wider access opening 89 at one end that is large enough in diameter to admit the pusher 76 into the slot. The placement of guides under the belt would confine the pusher to the narrow main portion of the slot.

Figures 8C, 8D:
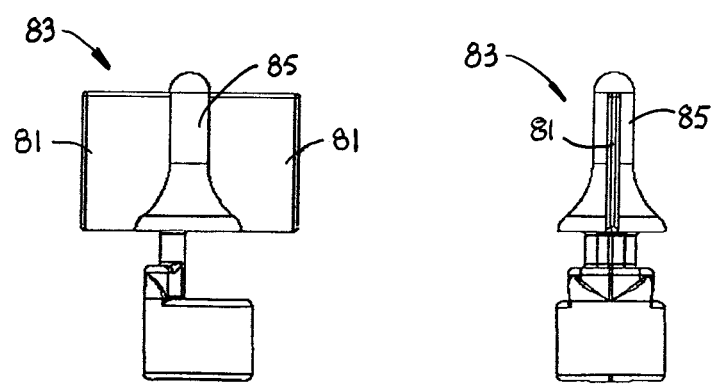
FIGS. 8A and 8B are side and front elevation views of a pusher used in a conveyor belt module as in FIGS. 7A-7D, and FIGS. 8C and 8D are side and front elevation views of a pusher as in FIGS. 8A and 8B with wings.
Figure 8A:
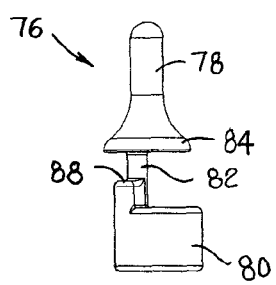
Figure 8B:
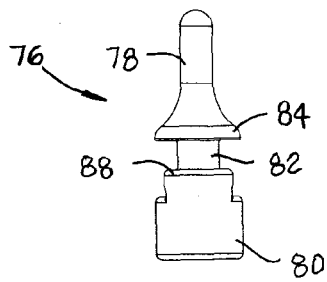

The pusher of FIGS. 8A and 8B is outfitted with wings 81 in FIGS. 8C and 8D to form a pusher 83 better suited to pushing non-rigid articles, such as bags. The wings extend from opposite sides of a central peg 85 parallel to the conveying direction when installed in a conveyor belt. Together the wings 81 form a vertical plate for pushing articles across the belt.

Figure 9:
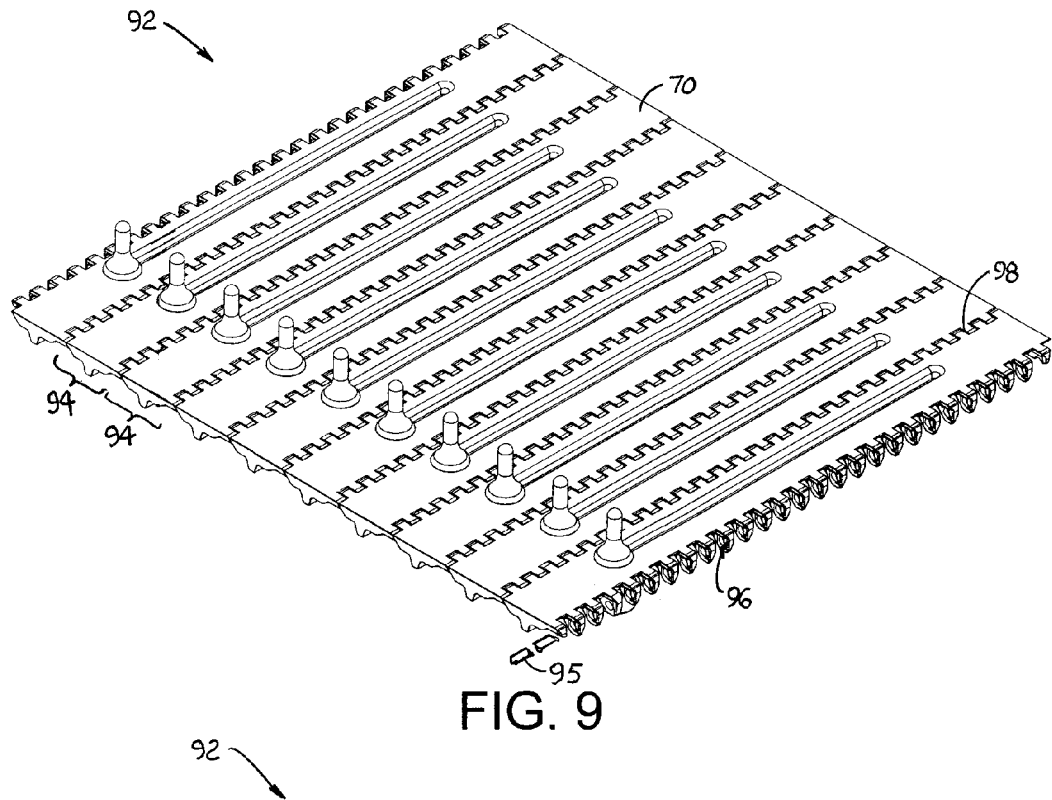
FIG. 9 is an isometric view of a portion of a conveyor belt constructed of modules as in FIGS. 7A-7D.
Figure 10:
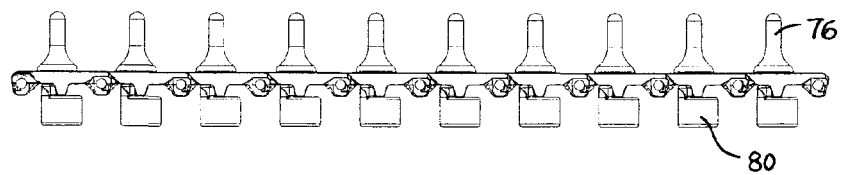
FIG. 10 is a side elevation view of the conveyor belt of FIG. 9.

A portion of the conveyor belt 92 constructed of rows 94 of the belt modules 70 is shown in FIGS. 9 and 10. The rows are joined by hinge rods 95 received in the aligned openings 96 of interleaved hinge elements 98 of adjacent rows. Instead of having pusher modules 70 in each row, the belt 92 could have pusher modules interspersed with pusherless and slotless standard modules.

Figure 11:
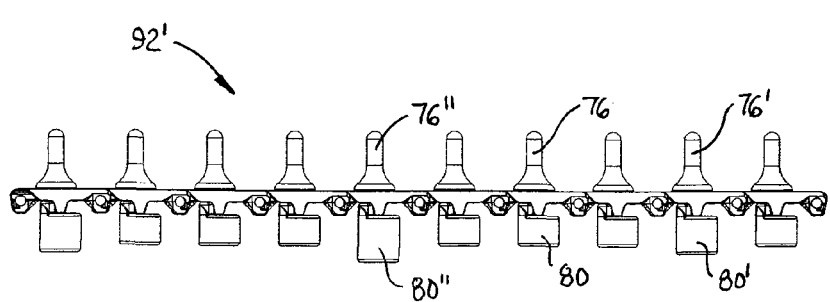
FIG. 11 is a side elevation view of a conveyor belt as in FIG. 9, but having cam followers of different heights on the pushers.
Figure 12:
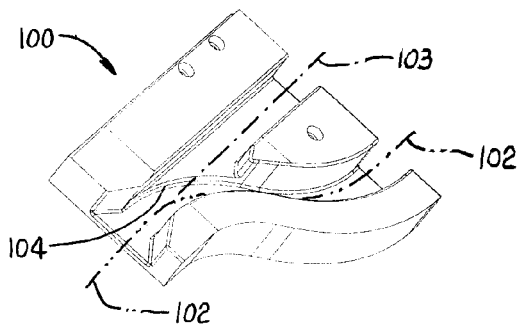
FIG. 12 is an axonometric view of one version of a guide mechanism usable with a conveyor belt as in FIG. 11.

As shown in the side view of FIG. 10, all the lower cam-follower portions 80 of the pushers 76 extend below the belt the same distance to the same depth. In another version, a conveyor belt 92', shown in FIG. 11, has lower cam-follower portions 80, 80', 80" on the pushers 76, 76', 76" that extend downward different distances to different depths. When used with a guide 100, 100' as in FIG. 12 or FIG. 13, the pushers 76, 76', 76" can be guided differently. The guide 100 of FIG. 2 is mounted in the conveyor carryway under the conveyor belt. The guide 100 has a deep channel 102 that veers to the right. A shallow channel 103 branches off from the deep channel, but in line with its upstream portion. The pushers 76" having the deepest cam followers 80" encounter a guide surface in the form of a ledge 104 at the branch of the deep and shallow channels 102, 103. The ledge guides the pushers 76" across the belt. The pushers 76, 76' having shallower cam followers 80, 80' clear the ledge 104 and maintain their lateral positions on the belt. The side walls of the channels 102, 103 form guides for the pushers.

Figure 13:
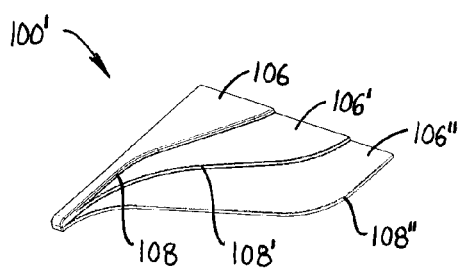
FIG. 13 is an isometric view of a terraced guide mechanism usable with a conveyor belt as in FIG. 11.

Another version of a diverting guide 100' underlying the conveyor belt in the carryway is shown in FIG. 13. This guide has three levels, or terraces 106, 106', 106", at three different depths. Ledges 108, 108', and 108" serve as guide surfaces for the pushers. The ledge 108 is between the top terrace 106 and the intermediate terrace 106'. The ledge 108' is between the intermediate terrace 106' and the bottom terrace 106". The ledge 108' forms the outer edge of the bottom terrace 106". The pushers 76" with the deepest cam followers 80" are guided across the belt by the bottom ledge 108". The intermediate and shallow cam followers 80', 80 clear the bottom ledge. The pusher 76' with the intermediate cam follower 80' is guided by the intermediate ledge 108', and the shallow cam follower 80 by the shallow ledge 108. In this way, the terraced guide 100' can translate the pushers 76, 76', 76" to different lateral positions across the width of the conveyor belt 92'.

Figure 14:
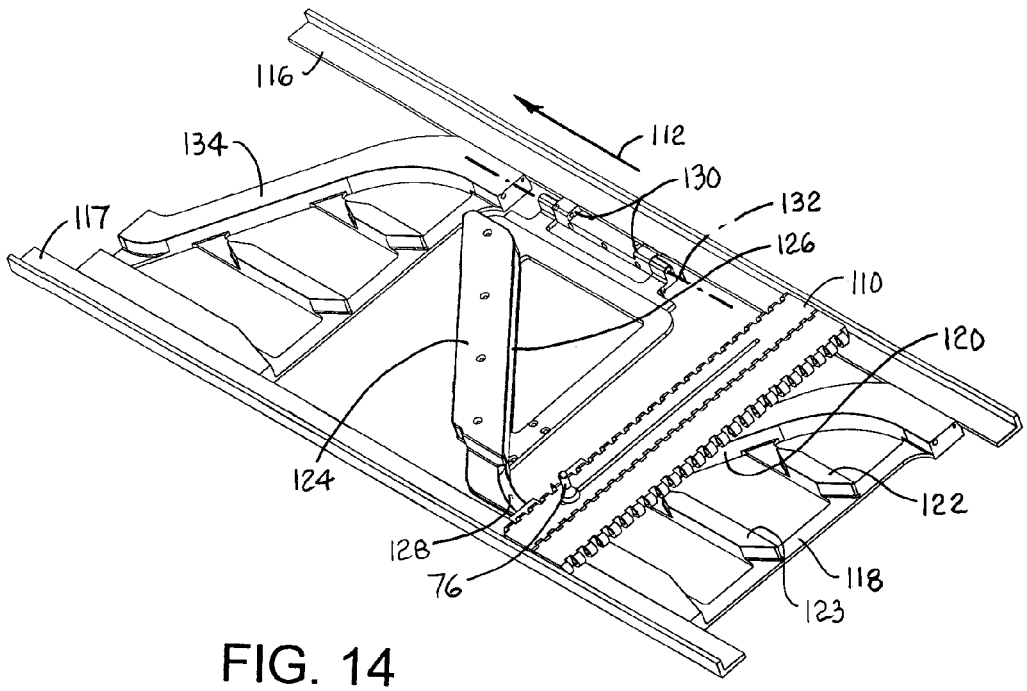
FIG. 14 is an isometric view of a portion of a carryway with fixed guide mechanisms and a retractable guide mechanism for guiding the pushers of a conveyor belt as in FIG. 10.
Figure 15A:
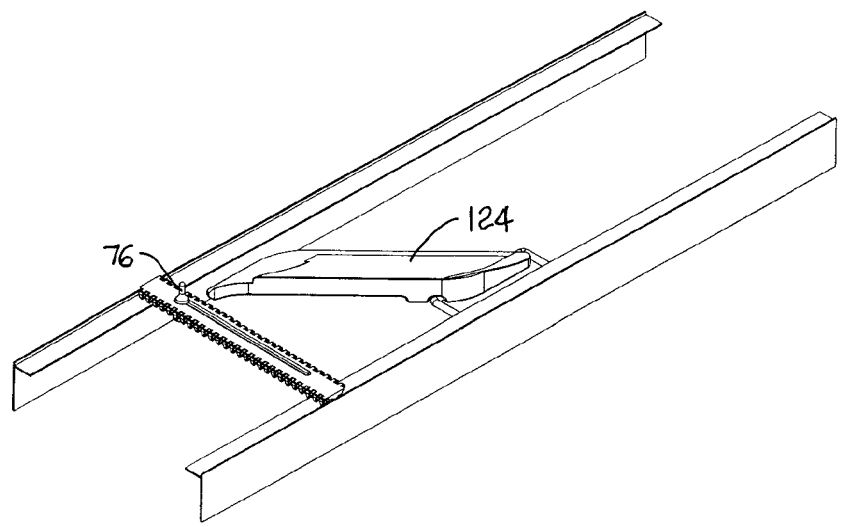
FIG. 15A is an isometric view of another version of a retractable guide mechanism usable with a conveyor belt as in FIG. 10, and FIGS. 15B and 15C are side elevation views of the retractable guide mechanism in retracted and unretracted positions.
Figure 15B:
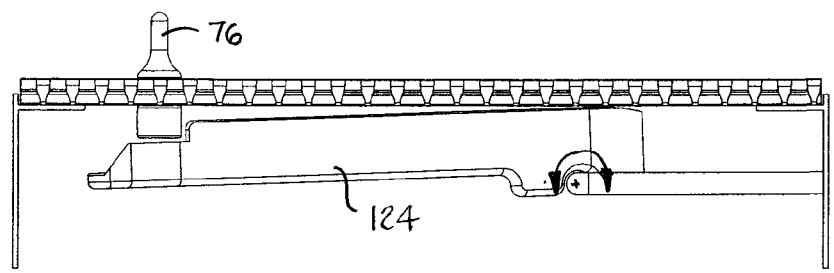
Figure 15C:
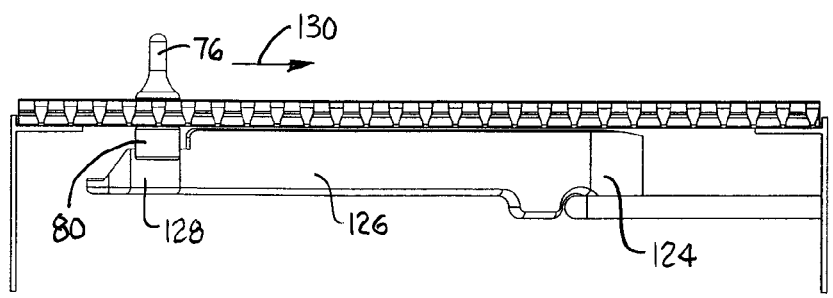
Figure 16A:
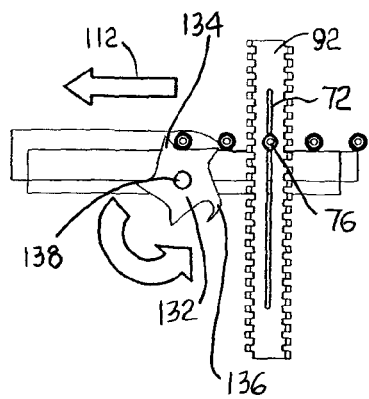
FIGS. 16A-16D are top plan views illustrating the sequential operation of a rotatable cam-actuated guide mechanism usable with a conveyor belt as in FIG. 10.
Figure 16B:
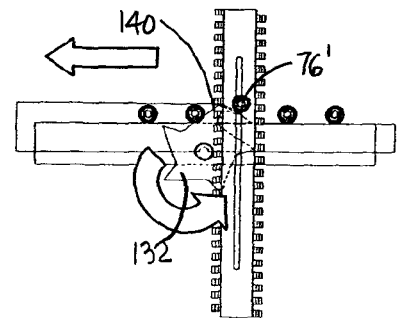
Figure 16C:
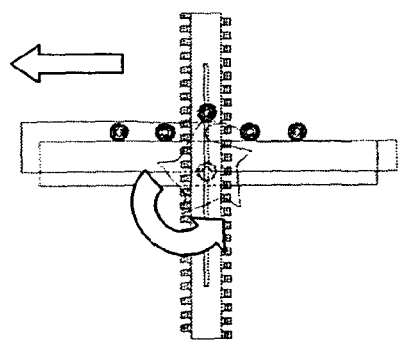
Figure 16D:
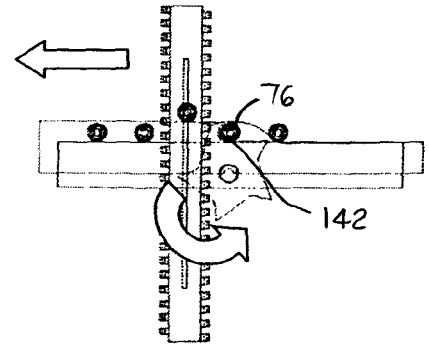

FIG. 14 shows two rows of a conveyor belt 110 advancing along a carryway in a direction of belt travel 112. A guide mechanism 114 is held in place under the conveyor belt by a pair of frame members 116, 117. The guide mechanism comprises a funnel-like upstream guide 118 with a curved guide wall 120 that guides all the cam followers and the pushers 76 to the left side of the belt. The top surfaces of islands 122, 123 provide support to the bottom surface of the belt 110. A selectively retractable diverting guide 124 has a diverter wall 126 with a curved input hook 128 that guides the pushers 76 to the right side of the belt when the guide is in a raised diverting position, as shown in FIG. 14. The guide is pivotably attached to the right-side frame member 116 by a hinge 130 that allows the guide to pivot about its pivot axis 132 downward to a retracted position, in which the pushers are not diverted. An actuator (not shown in the drawings), such as an air or hydraulic cylinder, a motor and gears, a solenoid, or other actuating device, is used to pivot the guide 124 between the retracted (non-diverting) position and the unretracted (diverting) position. The actuator can be controlled by a controller that receives sensor signals indicating an article's passing a certain location along the carryway and times the actuation of the actuator accordingly. A return funnel 134, identical to the input funnel in this example, guides the pusher 76 back to the left side of the conveyor belt. FIGS. 15A and 15B show the guide 124 in the retracted (non-diverting) position, allowing the pusher 76 to pass through without diverting. In FIG. 15C, the guide 124 is shown in an unretracted (diverting) position.

The hook portion 128 of the guide wall 126 intercepts the cam follower 80 of the pusher 76 and guides it across the belt to the right-hand side as indicated by arrow 130. In this example, the guide is swiveled about a hinge by an actuator (not shown), such as a linear actuator or a motor-driven rotating hinge. But the guide can be selectively retracted in other conventional ways. For example, the entire guide could be translated up into an upper diverting position and down into a lower non-diverting position by a conventional linear actuator.

Figure 17:
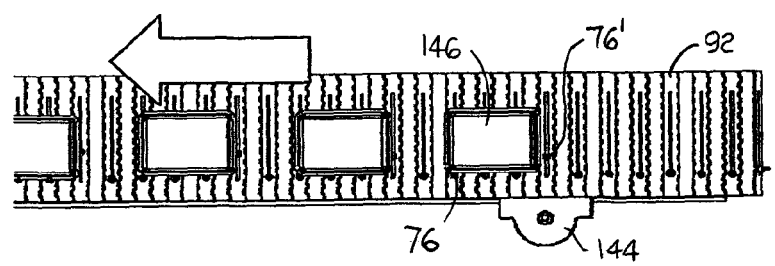
FIG. 17 is a top plan view of the conveyor belt of FIG. 10 with the pushers controlled by the guide mechanism of FIGS. 16A-16D.

FIGS. 16 and 17 show a cam-wheel guide mechanism for registering and metering conveyed articles. The cam wheel 132 in this example has five lobes: (a) four identical cam paddles 134 and (b) one diverting cam 136 equally spaced around the wheel's periphery. The circumferential spacing of the paddles and the diverting cam match the linear spacing, or pitch, of the slots 72 and the pushers 76. The cam wheel 132 is passive and pivots about a central pivot pin 138 defining an axis perpendicular to the plane of the conveyor belt 92. As the conveyor belt 92 advances in the direction of belt travel 112, the cam followers below the belt on the pushers 76 contact the paddles 134 to rotate the wheel through one-fifth of a complete rotation (72°) without changing the position of the pushers on the track 72, as shown in FIG. 16A. When the leading edge 140 of the diverting cam 136 contacts a pusher 76', it forces that pusher along the track, as shown in FIGS. 16B and 16C. The next pusher then engages a rear edge 142 of the diverter cam to rotate the cam another 72°, as shown in FIG. 16D. With the cam wheel 132 of FIG. 16A-D mounted in a housing 144 under a side edge of the conveyor belt 92, as in FIG. 17, every fifth pusher 76' is positioned away from the reset position of the other pushers 76. The four consecutive pushers 76 at the reset position serve to register all the conveyed articles 146 at the same lateral position across the width of the belt. The offset fifth pushers 76' meter the articles at equally spaced locations along the length of the belt. Cam wheels with different geometries can be used to achieve different effects.

FIGS. 18-27 depict various conveyor configurations using a pusher-belt diverter as in FIGS. 1-15 in different conveying applications.

Figure 18:
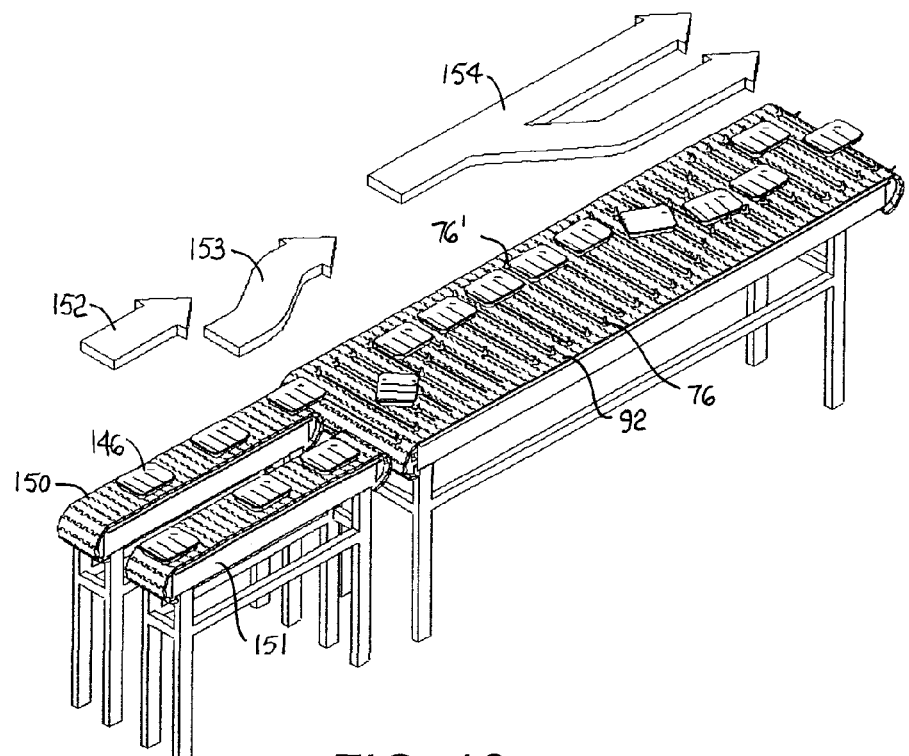
FIG. 18 is an isometric view of a peg-diverter belt as in FIG. 1 or FIG. 10 used in an infeed balance application.

FIG. 18 shows an infeed-balance configuration. Two infeed conveyors 150, 151 feed articles 146 in two lanes onto a conveyor belt 145 having two pushers 147, 147' (a right-side pusher 147 and a left-side pusher 147') in each slot 72. The pushers are arranged to have a left-side row of pushers and a right-side row of pushers as the belt 145 enters the infeed end of the carryway. The left-side pushers 147' remain in the reset position as indicated by arrow 152. The right-side pushers are guided to divert the articles on the right-side infeed conveyor 151 to the left, as indicated by arrow 153, aligned with the articles from the left-side infeed conveyor 150. A fixed, non-retractable guide can be used for the divert. A downstream guide, indicated by arrow 154, selectively guides left-side pushers 147' across the belt or leaves them in place to divert articles to the right or allow them to continue straight through along the left side. The right-side pushers 147 may optionally be guided by a fixed guide to align the diverted articles along the right side of the conveyor. In this way, the imbalances in the flow between the two infeed conveyors can be balanced upon exit from the pusher-belt diverter. In the example of FIG. 18 and all the following examples, the arrows indicate the geometry of the guides and the diversion paths of the pushers.

Figure 19:
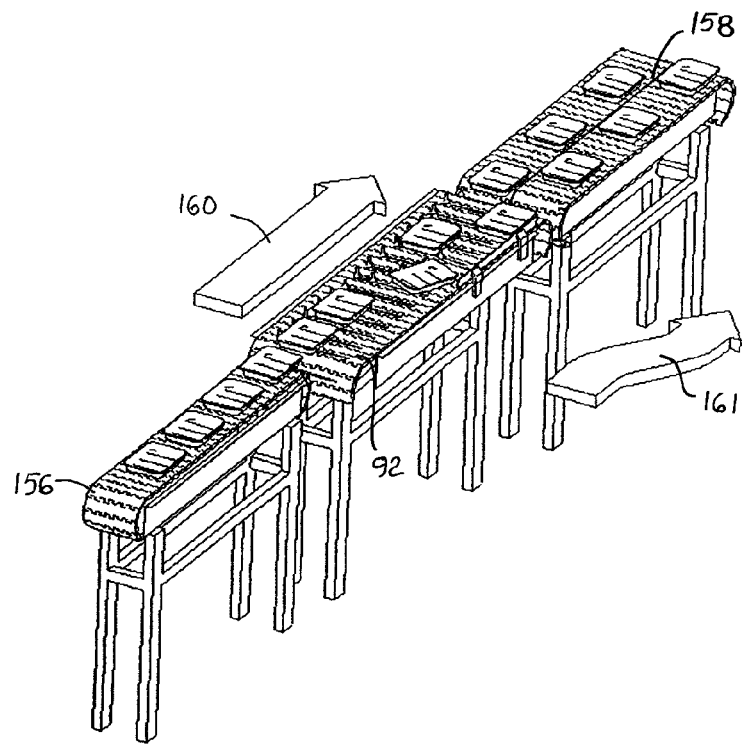
FIG. 19 is an isometric view of a peg-diverter belt used in a switch application.

FIG. 19 shows a switch configuration in which articles supplied by a single infeed conveyor 156 are switched from a single lane into two output lanes on an outfeed conveyor 158. The pusher-belt diverter selectively passes an article from the single file straight through (arrow 160) along the left side or diverts to the right side (arrow 161) of the pusher belt 145 to form the two lanes of articles.

Figure 20:
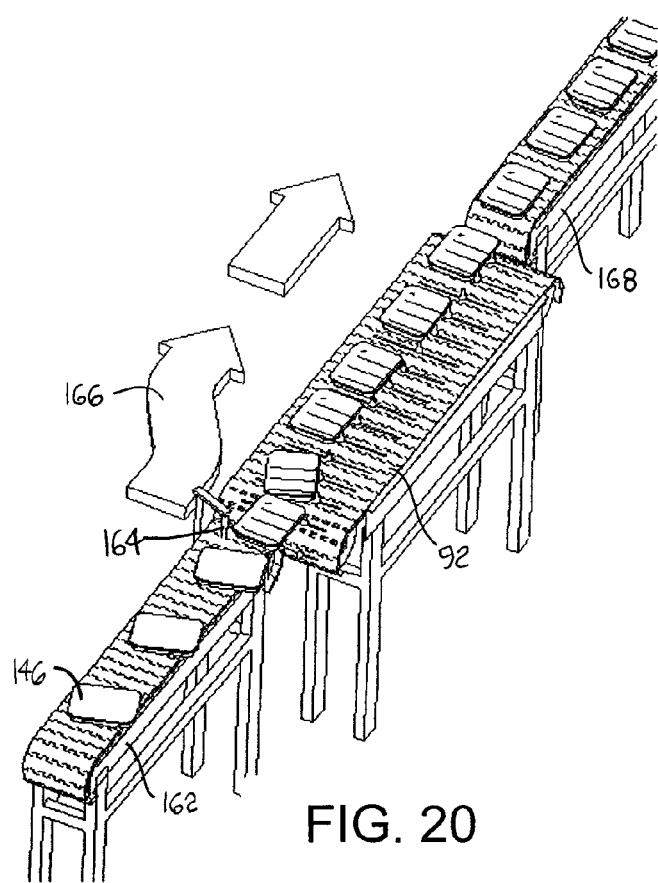
FIG. 20 is an isometric view of a peg-diverter belt used in a simple alignment application.

Simple alignment of a stream of articles is achieved with the conveyor configuration of FIG. 20. Articles 146 on an infeed conveyor 162 are pivoted by a bumper 164 as they enter the pusher belt 145. A guide diverts the incoming articles, as indicated by arrow 166, and aligns them on the belt in line with an outfeed conveyor 168. A fixed, non-retractable guide can be used in this configuration.

Figure 21:
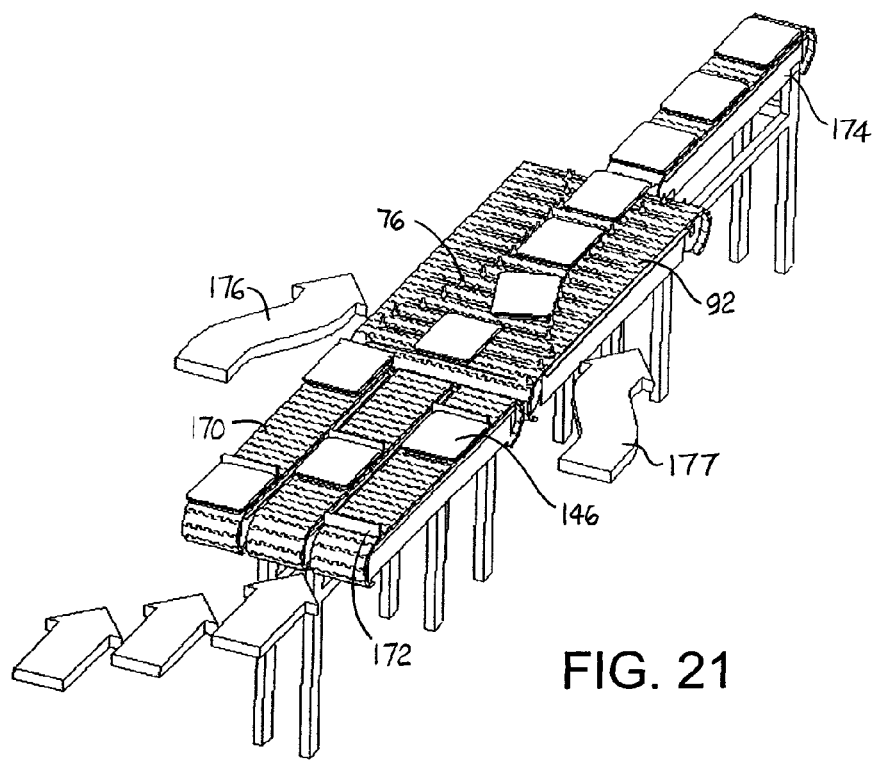
FIG. 21 is an isometric view of a peg-diverter belt used in a timed-infeed merge application.

A three-to-one merge-conveyor configuration is shown in FIG. 21. Three parallel infeed conveyor belts 170 with registration flights 172 meter and deliver articles 146 to the pusher belt 145 one at a time from each infeed belt in round-robin fashion. A guide guides the pushers 147 from outside positions to inner positions to plow the articles into a single file aligned with an outfeed conveyor 174 as indicated by arrows 176, 177. Fixed guides can be used to guide the pushers 147.

Figure 22:
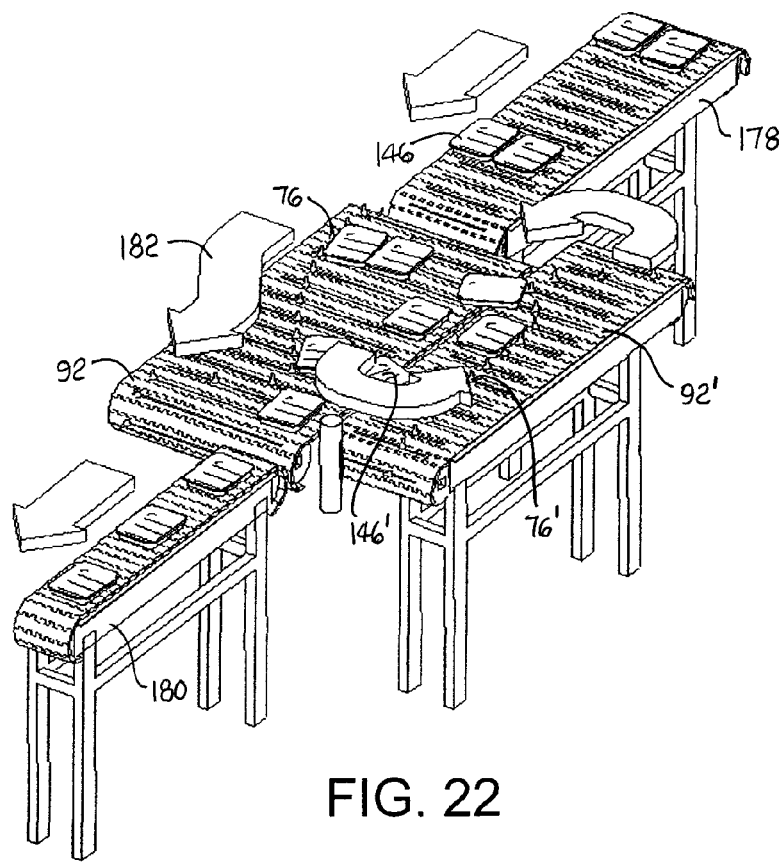
FIG. 22 is an isometric view of two peg-diverter belts used in a recirculating singulation application.

FIG. 22 depicts a singulator with recirculation to prevent articles from exiting side by side. An infeed conveyor 178 is shown delivering articles 146 two abreast to the pusher belt 145. The pushers 147 are guided to plow the articles toward one side to form a single file aligned with an outfeed conveyor 180, as indicated by arrow 182. Side-by-sides 146' are pushed off the side of the pusher belt 145 onto a recirculation pusher belt 145' running in the opposite direction. The guide for the recirculation belt 145' positions its pushers 147' to direct the recirculated articles 146' back onto the first pusher belt 145 to be singulated. Fixed guides can be used to position the pushers 147.

Figure 23:
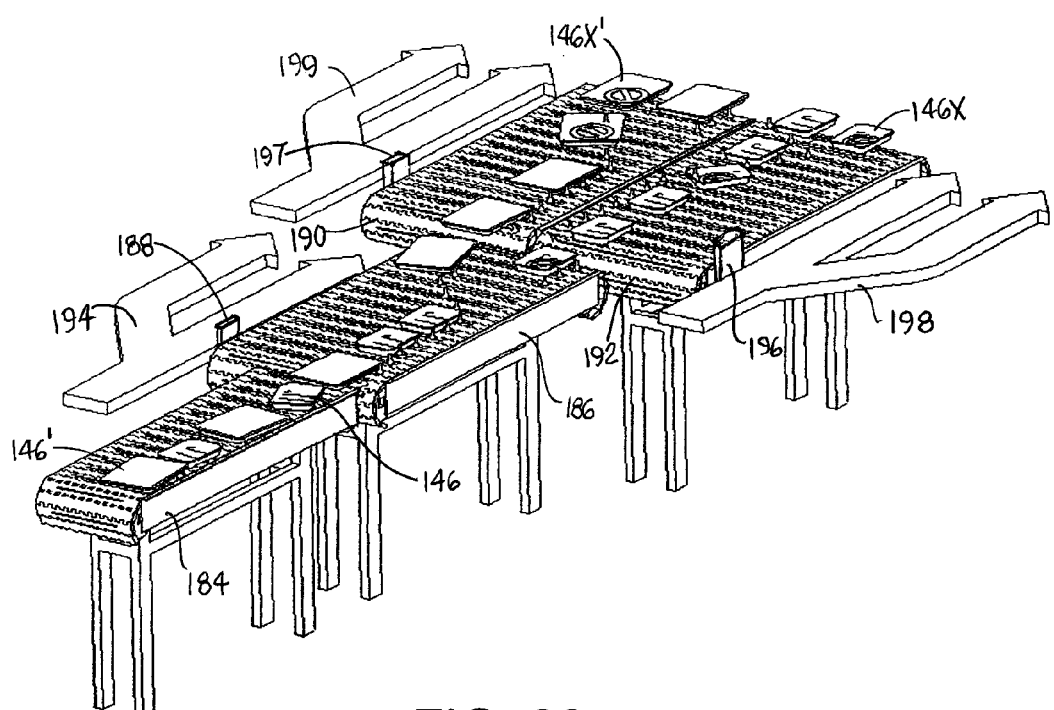
FIG. 23 is an isometric view of three peg-diverter belts used in a size-sorting-with-rejection application.

The conveyor configuration of FIG. 23 can sort articles of different sizes and selectively reject articles. An infeed conveyor 184 delivers small 146 and large 146' articles to a pusher-belt diverter 186 that sorts the articles by size. A size sensor 188 sends a signal to a guide under the belt to selectively divert large articles to a left-side pusher-belt diverter 190 and small articles to a right-side pusher-belt diverter 192 as indicated by arrow 194. Like the size sensor, quality sensors 196, 197 send signals indicative of product quality to the associated guide mechanisms for each quality diverter 190, 192 to selectively divert rejected articles 146X and 146X', as indicated by arrows 198, 199.

Figure 24:
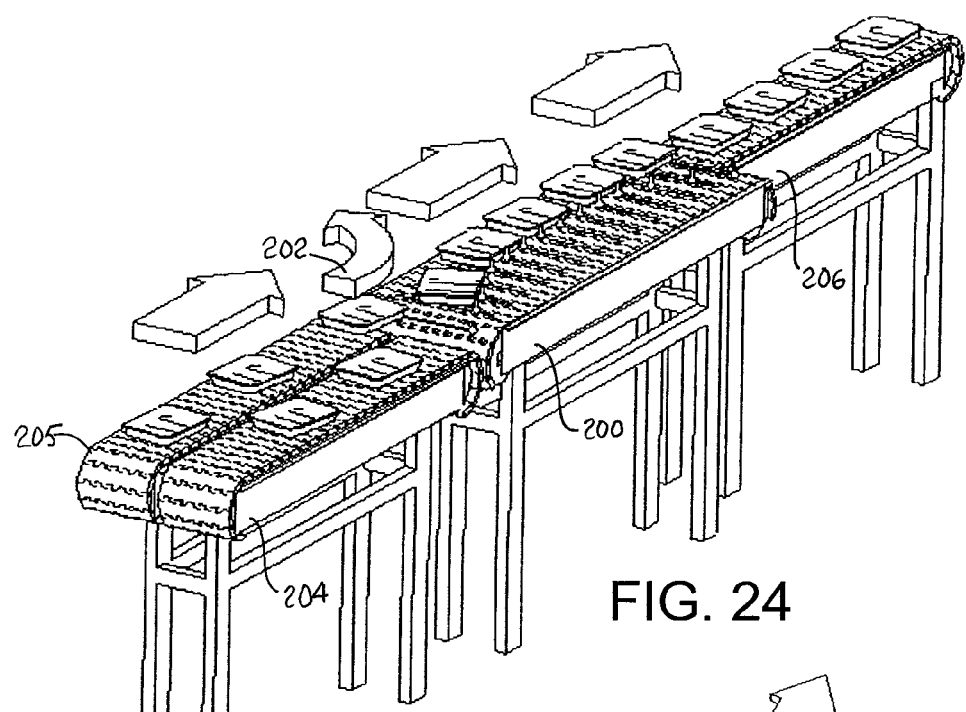
FIG. 24 is an isometric view of a peg-diverter belt used in a simple merge application.

The simple merge conveyor of FIG. 24 uses a pusher-belt diverter 200 with a fixed diverter guide, whose operation is indicated by arrow 202, to merge two lanes of articles from two side-by-side infeed conveyors 204, 205 feeding articles one at a time to the pusher-belt diverter. The merged articles are delivered single file to a downstream outfeed conveyor 206.

Figure 25:
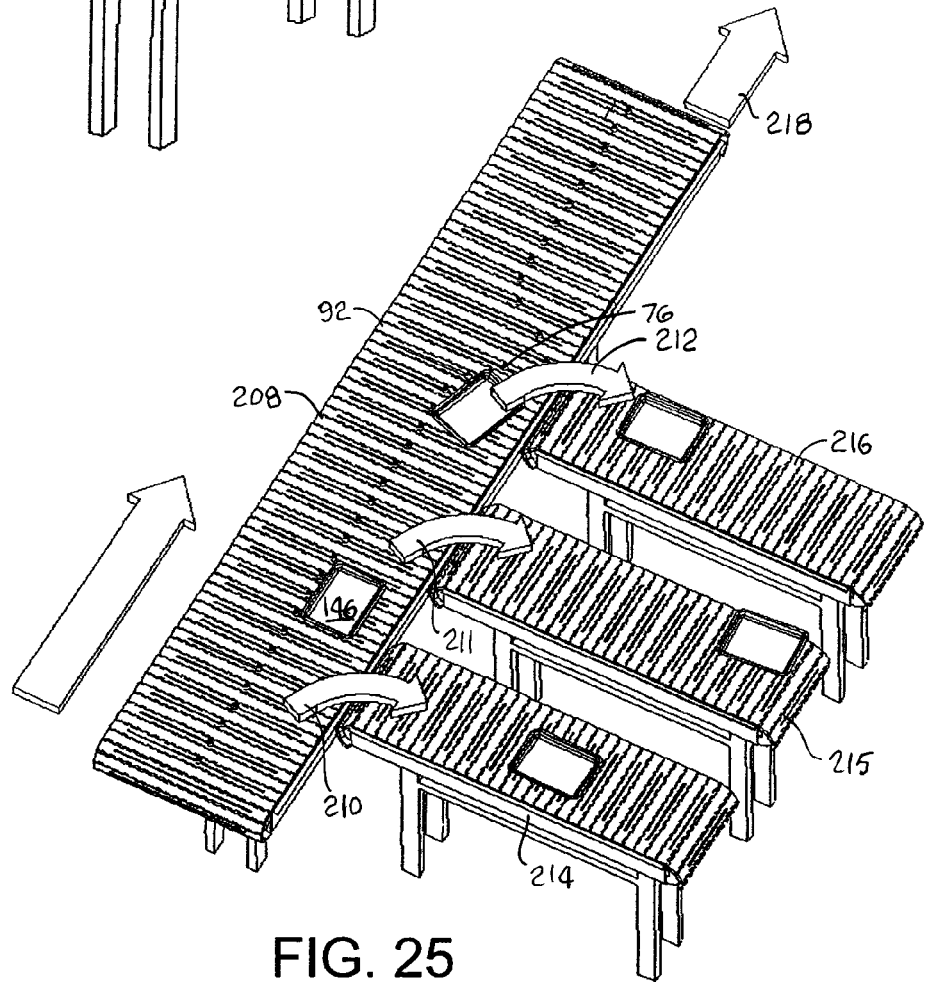
FIG. 25 is an isometric view of a peg-diverter belt used in a sorting application.
Figure 26:
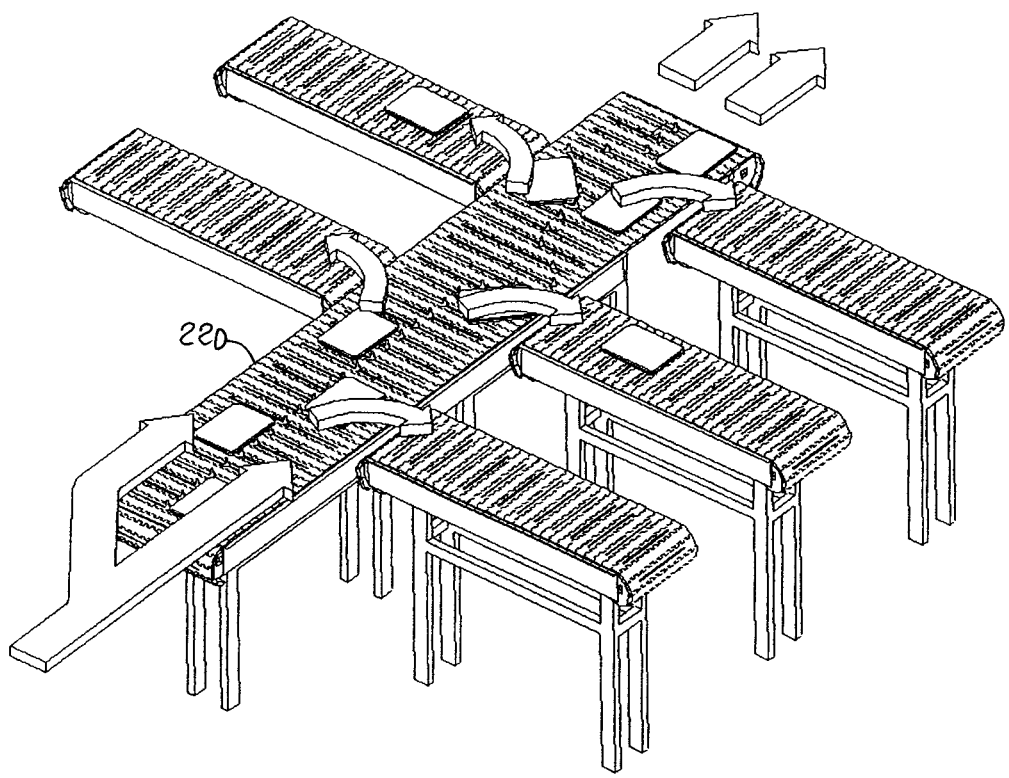
FIG. 26 is an isometric view of a peg-diverter belt used in a two-lane sorting application.

In the sorter shown in FIG. 25, articles 146 on a pusher-belt diverter 208 are diverted by selectively actuated guides underlying the peg belt 145 at sequential locations indicated by arrows 210, 211, 212. When a guide is actuated, it directs the pushers 147 to push the articles off the side of the pusher-belt diverter onto an associated one of the sorting conveyors 214, 215, 216. If none of the guides is actuated for an article, the article continues to advance off the end of the pusher belt 145, as indicated by the arrow 218. The pusher-belt diverter can also be operated as a two-lane sorter as shown in FIG. 26 to sort articles off either side of the diverter 220 to multiple sorting conveyors.

Figure 27:
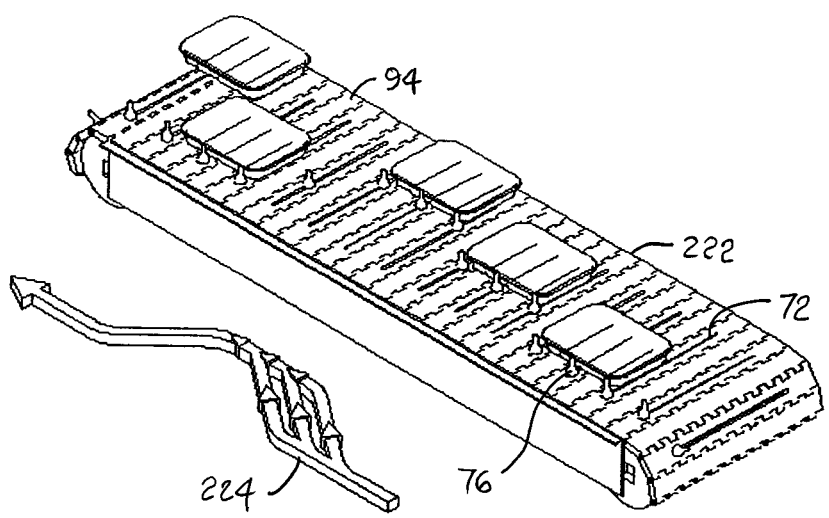
FIG. 27 is an isometric view of a peg-diverter belt illustrating multiple consecutive peg pushers translated in parallel to maintain article orientation during diversion.

The pusher-belt diverter 222 of FIG. 27 diverts articles from one lane to another without changing the articles' orientations. The guide has three parallel guide walls as indicated by the three paths in the arrow diagram 224. The three paths are spaced apart from each other by the spacing, or pitch, of the pushers 147 and their slots 148. With this configuration, three pushers are translated across the belt 145 simultaneously, which translates an article more or less centered on the three pushers from the left lane to the right lane without pivoting. If the guide is not actuated, the pushers remain in their reset position to maintain an article in the left lane.

What is claimed is:

1. A conveyor belt comprising:
   a top side;
   a plurality of parallel tracks extending across the width of the conveyor belt on the top side transverse to the direction of belt travel;
   a plurality of pegs arranged to ride along the tracks, wherein each of the pegs includes an upper portion above the top side of the conveyor belt;
   a plurality of vertical plates, each of the vertical plates extending above the top side of the conveyor belt from the upper portion of one of the pegs;
   wherein the vertical plates ride with the pegs along the tracks and
   wherein the plurality of tracks are formed by elongated slots extending through the conveyor belt from the top side to an opposite bottom side and wherein the upper portion of the pegs has outer dimensions greater than the width of the elongated slot.

2. A conveyor belt as in claim 1 wherein the vertical plates extend from the pegs in the direction of belt travel.

3. A conveyor belt as in claim 1 wherein the upper portion of the pegs has a lower skirt having outer dimensions greater than the width of the elongated slot and wherein the outer dimensions of the upper portion of the pegs above the lower skirt are less than the width of the elongated slot.

4. A conveyor belt comprising:
   a top side;
   a plurality of parallel tracks extending across the width of the conveyor belt on the top side transverse to the direction of belt travel;
   a plurality of pegs arranged to ride along the tracks, wherein each of the pegs includes an upper portion above the top side of the conveyor belt;
   a plurality of vertical plates, each of the vertical plates extending above the top side of the conveyor belt from the upper portion of one of the pegs;
   wherein the vertical plates ride with the pegs along the tracks;
   a plurality of belt modules, each extending in length from a trailing end to a leading end in the direction of belt travel, in width from a left side to a right side, wherein the plurality of belt modules are arranged end to end and wherein at least some of the belt modules include:
      a deck extending in length from the leading end to the trailing end and in width from the left side to the right side and from the top side of the conveyor belt to an opposite bottom side;
      an elongated slot formed in the deck from the top side to the bottom side and extending across the width of the deck to form one of the tracks;
      a bar extending along the width of the belt module along the bottom side of the deck;
      wherein the pegs each have a through hole receiving the bar to retain the peg on the bar as the peg translates across the belt module along the elongated slot.

5. A conveyor comprising:
a conveyor belt advancing in a direction of belt travel and including:
  a top side;
  a plurality of parallel tracks extending across the width of the conveyor belt on the top side perpendicular to the direction of belt travel;
  a plurality of pegs arranged to ride along the tracks, wherein each of the pegs includes an upper portion above the top side of the conveyor belt;
  a plurality of vertical plates, each of the vertical plates extending above the top side of the conveyor belt from the upper portion of one of the pegs;
  wherein the vertical plates ride with the pegs along the tracks and
  wherein the plurality of tracks are formed by elongated slots extending through the conveyor belt from the top side to an opposite bottom side, wherein the pegs extend through the elongated slots with a lower portion of the pegs below the bottom side of the belt;
a guide having a guide surface below the bottom side of the belt and angled across the width of the conveyor belt in contact with the pegs to push the pegs along the track as the conveyor belt advances in the direction of belt travel.

6. A conveyor as in claim 5 wherein the vertical plates extend from the pegs in the direction of belt travel.

\* \* \* \* \*